Oct. 23, 1956
F. P. ALLES
2,767,435
PROCESS FOR LONGITUDINALLY STRETCHING POLYMERIC FILM
Filed June 5, 1952
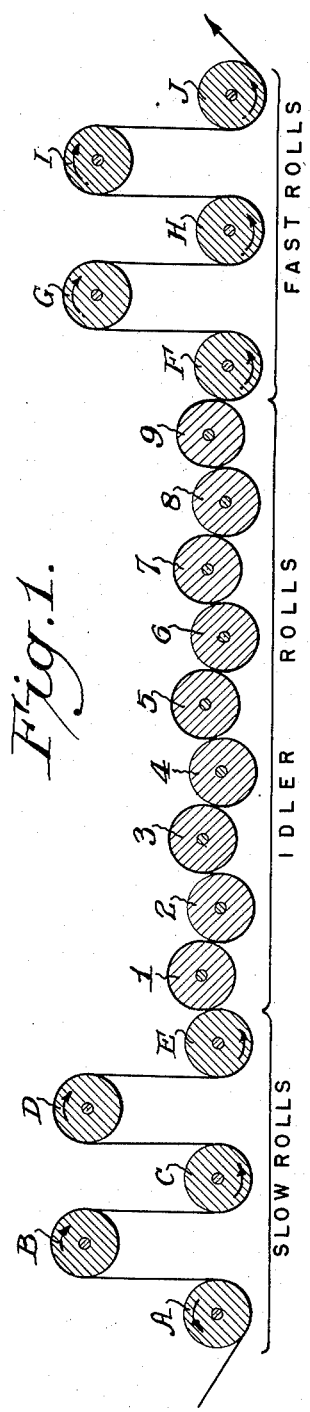
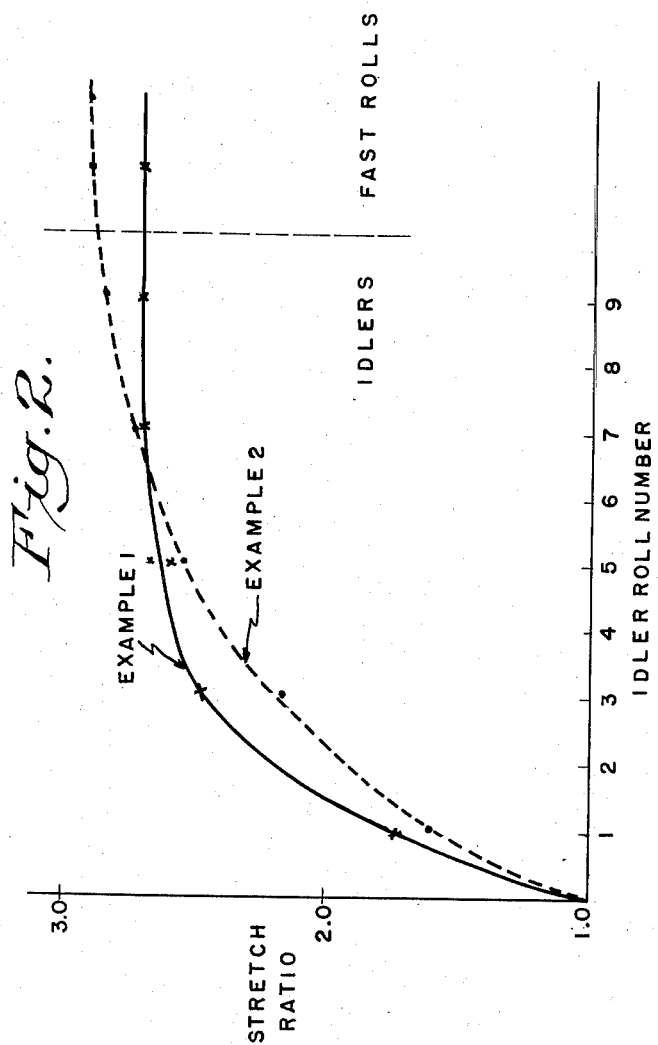
INVENTOR
FRANCIS PETER ALLES
BY
ATTORNEY

United States Patent Office 2,767,435
Patented Oct. 23, 1956

2,767,435

PROCESS FOR LONGITUDINALLY STRETCHING POLYMERIC FILM

Francis Peter Alles, Westfield, N. J., assignor to E. I. du Pont de Nemours and Company, Wilmington, Del., a corporation of Delaware Application June 5, 1952, Serial No. 291,919

2 Claims. (Cl. 18—48)

This invention relates to the stretching of polymeric film and, more particularly, to a process for longitudinally stretching a polymeric film to reduce uniformly the thickness thereof; obtain uniform orientation; and prevent excessive reduction in the width of the film.

There are numerous synthetic linear organic polymers which are capable of being formed into translucent or transparent films having excellent physical properties. Such films are highly useful in a great variety of applications, e. g., packaging, electrical applications, protective coverings, glass replacement, fabric replacement, etc. On the other hand, certain physical properties of these films, such as tensile strength, impact strength, flex life, and water vapor and organic vapor permeability, are not competitive with those of other types of films, fabrics, etc. However, in most instances, these physical properties may be improved by stretching the films in one or both directions, i. e., longitudinally and transversely. Furthermore, with certain materials, stretching may also effect a change in the optical properties.

A great number of improved techniques and apparatus for stretching films prepared from well known organic polymeric compositions have been developed heretofore. However, in spite of such improvements, the main problem of continuously producing a uniformly stretched film is still encountered in known stretching techniques. A uniformly stretched film is one in which the thickness and width have been reduced uniformly and one in which the molecules are uniformly oriented as indicated by birefringence measurements. Under conditions of continuous stretching in the longitudinal direction, it is most desirable to reduce the thickness of the film to a uniform caliper while uniformly reducing the width of the film to only a minimum degree.

The simplest and most economical means for longitudinally stretching polymeric film comprises a group of horizontally disposed, closely-spaced, parallel driven rolls, generally designated as "slow" rolls, followed by a group of horizontally disposed, closely-spaced, parallel driven rolls driven at a higher speed and known as "fast" rolls. In order that a firm grip may be maintained on the film being stretched, at least three rolls are employed in each group. Stretching of the film takes place between the last slow roll and the first fast roll (stretching distance), and the stretch ratio (the amount by which the film is stretched) is determined by the difference in speed between the slow rolls and the fast rolls. The serious objection to this arrangement is that the film tends to excessive and non-uniform "neck-in" (reduction in film width) as the film passes through the stretching distance. To obviate this difficulty, it has been proposed to place the last slow roll and first fast roll closer together and thus shorten the stretching distance. However, when the stretching distance is shortened, by this expedient, to the point where necking-in is reduced to within acceptable limits, it proves to be insufficient to provide for continuous uniform longitudinal stretching at commercially feasible stretching rates and at relatively high stretching ratios.

An object of the present invention is to provide a continuous process for longitudinally stretching a polymeric film over substantial stretching distances while preventing excessive and non-uniform necking in. A further object is to provide a continuous process of longitudinally stretching a polymeric film at relatively high stretching rates and at stretching ratios greater than 1.5. A still further object is to provide a continuous process of stretching a polymeric film longitudinally to produce a film of uniform caliper while its widthwise dimension is uniformly reduced to only a minimum degree. Other objects will appear more clearly from the description given hereinafter.

These objects are accomplished by the present invention which, briefly stated, comprises longitudinally stretching a polymeric film between opposed tensional forces acting lengthwise of the film, uniform stretching being carried out over a multiplicity of closely-spaced, parallel, idler rolls disposed in closely-spaced relationship between said tension forces. Preferably, the opposed tension forces are provided by means of two groups of positively driven, tension-applying rolls, the number of parallel idler rolls disposed therebetween being such that the last idler roll is rotating at substantially the same rate as the fast rolls; and the distance between the circumferences of the last positively driven slow roll and the first idler roll, the distance between each of the circumferences of adjacent idler rolls, and distance between the circumferences of the last idler roll and the first fast roll being, in each instance, no greater than from 1.5–5 times the thickness of the film before stretching.

The following examples will serve to illustrate the principles and practice of this invention, reference being had to the accompanying drawing wherein:

Figure 1 is a diagrammatic representation of a preferred form of continuous longitudinal stretching apparatus for use in carrying out this invention; and Figure 2 is a plot of stretch ratio against the number of idler rolls.

Referring to Figure 1, the longitudinal stretching apparatus is comprised of three groups of horizontal rolls disposed in parallel. The first group of five rolls, A, B, C, D, and E, are positively driven and are the "slow" rolls. The next group of nine, 1–9 inclusive, are idler rolls over which actual stretching is carried out. The last group of five rolls, F, G, H, I, and J, are positively driven at a greater speed than the slow rolls, these being the "fast" rolls. As mentioned before, the difference in speed determines the stretch ratio. All of the rolls in the longitudinal stretching section are chromium plated and each is 30" wide by 4½" in outside diameter. The distance between the circumferences of adjacent slow rolls and adjacent fast rolls is 4". The distance between the circumferences of the last slow roll and the first idler roll, the last idler roll and the first fast roll, and between adjacent idler rolls is 0.012". As shown in Figure 1, alternate rolls in the same group are in the same horizontal planes.

EXAMPLE 1

Polymeric polyethylene glycol terephthalate prepared by ester exchange between dimethyl terephthalate and ethylene glycol, in accordance with the general procedure described in U. S. P. 2,465,319 to Whinfield and Dickson, was extruded into the form of a film 20" in width and 0.004" in thickness. The film was in the amorphous form. Both ends of the lip opening of the extrusion hopper were widened to form a film having beaded edges. The beaded edges were about ¼" wide and 0.009" in thickness. (The function of the beaded edges is described in copending application U. S. Serial No. 247,977, filed September 24, 1951, in the name of K. L. Knox.)

For stretching this film about 3 times (3×) in the longitudinal direction, the following conditions were employed: All of the rolls were internally heated so that the surfaces were at a temperature between 85–90° C. All of the slow rolls were driven at about 9.7 yards per minute, and the fast rolls were positively driven at about 26.7 yards per minute. This represents a stretch ratio of about 2.75. In order to determine the actual number of idler rolls necessary to obtain uniform longitudinal stretching, the speed of alternate idler rolls was measured and the data are recorded in Table I.

*Table I*

| Roll Number | Roll Speed (Yards Per Minute) |
|---|---|
| Last driven slow roll | 9.7 |
| First idler roll | 16.7 |
| Third idler roll | 24.7 |
| Fifth idler roll | 25.8 |
| Seventh idler roll | 26.5 |
| Ninth idler roll | 26.7 |
| Second driven fast roll | 26.7 |

The resulting longitudinally stretched film was of uniform caliper (0.0014"). Furthermore, the resulting film width was uniform at about 18", and the film was highly transparent. From Table I, it is clearly illustrated that longitudinal stretching was carried out over a distance represented by the amount of film extending from the last slow roll to about the sixth or seventh idler roll. This is indicated by the fact that the sixth idler roll is rotating at approximately the same speed as the fast rolls. The gradual stretching of the film from its unstretched condition to about 2.75× is clearly indicated in Figure 2 in which the idler roll number is plotted against stretch ratio. Hence, this example demonstrates that to effect gradual uniform longitudinal stretching under the conditions given, approximately 6 idler rolls are required to obtain optimum uniform stretching.

EXAMPLE 2

The conditions recited in Example 1 were exactly the same except that the slow rolls were driven at about 12.7 yards per minute and the fast rolls were driven at about 37.9 yards per minute. This difference in speed represents a stretch ratio of about 2.96×. Table II illustrates the speed of each of alternate idler rolls under these conditions.

*Table II*

| Roll Number | Roll Speed (Yards Per Minute) |
|---|---|
| Last driven slow roll | 12.7 |
| First idler roll | 20.3 |
| Third idler roll | 27.5 |
| Fifth idler roll | 32.8 |
| Seventh idler roll | 35.3 |
| Ninth idler roll | 37.0 |
| Second driven fast roll | 37.9 |

Table II illustrates that at least nine idler rolls, which represents a stretching distance equivalent to the amount of film extending from the last slow roll to the ninth idler roll, were functioning to stretch uniformly the film under the given conditions from an original caliper of 0.004" to a uniform caliper of 0.00135". Figure 2 shows the gradual stretching of the film over the idler rolls. Under the conditions of this example, the resulting film was of uniform caliper and of uniform width (18"), and the film was highly transparent.

It is to be understood that the foregoing examples are merely illustrative and that the present invention broadly comprises longitudinally stretching a polymeric film between opposed tension forces acting lengthwise of the film, uniform stretching being carried out over a multiplicity of parallel idler rolls disposed between said tensional forces. Besides polyethylene glycol terephthalate and other similar types of synthetic linear polyesters, the present invention is fully applicable to films formed from various other types of synthetic linear organic polymers such as the polyamides, i. e., polyhexamethylene adipamide, polyhexamethylene sebacamide, polycaproamide, and other types described in U. S. Patents 2,071,250 and 2,071,253; vinylidene chloride; rubber hydrochloride; polystyrene; polyvinyl alcohol; polyvinyl acetals; certain vinyl compounds such as vinyl acetate-chloride copolymers; and various other polymeric materials which are stretchable at various temperatures.

The various essential conditions of stretching, i. e., stretch ratio, stretching rate, temperature, etc., are fully dependent upon the particular polymeric film composition and upon the end use for the stretched film. For various end uses such as adhesive tapes and electrical tapes, it is important that the film be stretched in only the longitudinal direction. This is mainly because the tensile strength in the longitudinal direction should be maximum while the tear strength in the transverse direction should be at a maximum. On the other hand, for various wrapping and packaging applications, it is essential that the films be stretched in both the longitudinal and transverse direction to obtain a balanced sheet. With respect to temperature, it is well known that the temperatures at which various compositions may be stretched varies widely with the particular polymers. In many cases, the temperature range in which a film may be stretched is highly critical and in many cases, a film must be stretched in a transverse direction at a different temperature than that at which it is stretched in the longitudinal direction. This is true for polyethylene terephthalate film. Usually, the films are stretched at temperatures above room temperature; and it is necessary to maintain the positively driven stretching rolls and the idler rolls at the required temperatures. This is usually accomplished by internal heating with hot water or steam. On the other hand, some polymeric films may be stretched at room temperature. In general, the range of temperatures within which various polymeric films may be stretched also affects the rate at which the film may be stretched. Obviously, it is highly desirable to be able to stretch a film continuously at relatively high rates, i. e., 75–200 yards per minute; but with some films, even under optimum temperature conditions, there is a limiting rate at which a film may be stretched (above that rate, non-uniform stretching and film breakage occurs); and this limiting rate is dependent upon the particular stretch ratio.

The process of the present invention is effective in obtaining uniform stretching when relatively high stretching ratios and relatively high stretching rates are employed. The number of idler rolls required to obtain optimum uniform stretching increases with an increase in stretch ratio and rate of stretch. For example, if the slow rolls are rotating at a rate of about 5 yards (which is below the minimum commercially feasible rate) and the stretch ratio is 3 (this means that fast rolls will be rotating at 30 yards per minute), the use of idler rolls to provide for uniform stretching would not be necessary. However, as the rate of stretch and/or the stretch ratio increase, the number of idler rolls required to obtain uniform stretching increases; and the required number is fixed by the particular stretching conditions and polymeric film being stretched. As mentioned hereinbefore, the stretching conditions mainly comprise stretching rate, stretch and temperature. On the other hand, the particular polymer from which the film is prepared and the caliper of the film also affect the number of idler rolls required for uniform stretching. Hence, the number of idler rolls employed is such that the last idler roll is rotating at substantially the same rate as the fast rolls. It is obvious that additional idle rolls which are operating at exactly the same speed as the fast rolls merely act as additional fast rolls and serve no useful function insofar as providing for gradual stretching. As shown in Figure 2, the polymeric film gradually approaches its ultimate stretched condition as it passes from one idler roll to the next.

The distance between the last slow roll and the first idler roll, the distance between adjacent idler rolls, and the distance between the last idler and the first fast roll should be close enough to provide for substantial continuous application of lateral reaction forces upon the film. It has been found that this distance should be between 1.5–5 times the thickness of the film before stretching. Substantially greater clearance results in excessive necking-in, and the advantages of the present invention are lost. In general, the distance between adjacent slow rolls and adjacent fast rolls is not critical because no stretching takes place between these rolls.

On the basis that the distance between the last slow roll and the first idler roll, the distance between adjacent idler rolls, and the distance between the last idler roll and first fast roll is no greater than 1.5–5 times the thickness of the film before stretching, the use of the optimum number of idler rolls results in a minimum reduction in film width after longitudinal stretching, that is, about 10%. This assumes that there is little or no transverse slippage of the film. This may be taken care of by following the process of copending application U. S. Serial No. 247,977, filed September 24, 1951 in the name of K. L. Knox, now U. S. Patent No. 2,718,666 which process relates to stretching a film having beaded edges. By reducing the number of idler rolls below the optimum number, the amount of reduction in film width or necking-in can be controlled to any degree up to a maximum of about 25–35% when no idler rolls are employed. As a polymeric sheet material undergoes stretching by the application of opposed tensional forces, the natural tendency is to reach the narrowest possible width consistent with the magnitude of the tensional forces involved and with the physical characteristics of the material. Stretching a film or sheet material without restricting reduction in the widthwise dimension effects molecular orientation as measured by birefringence. The process of the present invention is designed to minimize reduction in film width, and this type of stretching does not produce maximum obtainable molecular orientation. However, the difference between maximum attainable orientation and that obtained by the present process is not appreciable when the overall improvement in physical properties over those of unstretched film is considered.

The present process may be applied to polymeric films, sheets, webs, ribbons, etc. of any particular film caliper except with respect to sheets which are so thick as to lose their identity with respect to being considered a film. Generally, sheets greater than 0.1″ are too thick for stretching in conventional apparatus.

As many widely different embodiments may be made without departing from the spirit and scope of my invention, it is to be understood that said invention is in no wise restricted save as set forth in the appended claims.

I claim:

1. A process for longitudinally stretching a traveling continuous web of polymeric film which comprises continuously stretching the traveling web between opposed means adapted to stretch the web lengthwise therebetween, while maintaining the web between said means in contact with a plurality of closely spaced, parallel, cylindrical surfaces, each freely rotatable on an axis at right angles to the longitudinal axis of the web and in a plane parallel to the plane of said web, the distance between the circumference of adjacent cylindrical surfaces and the distance between the circumference of each cylindrical surface adjacent said opposed stretching means being no greater than 5 times the thickness of the web before stretching, said web passing alternately under and over said cylindrical surfaces.

2. In the process for longitudinally stretching a traveling continuous web of polymeric film wherein the web is longitudinally and continuously stretched between a slow stretching roll and a fast stretching roll, the improvement which comprises maintaining said web between said stretching rolls in contact with a multiplicity of closely spaced idler rolls, the number of said idler rolls being such that the last idler roll contacted before the web contacts said fast stretching roll rotates at substantially the same rate of linear speed as does said fast stretching roll, and the distance between the circumferences of adjacent rolls is no greater than 5 times the thickness of the web before stretching, said web passing alternately under and over said idler rolls.

References Cited in the file of this patent

UNITED STATES PATENTS

| | | |
|---|---|---|
| 2,000,079 | Herndon | May 7, 1935 |
| 2,321,635 | Taylor | June 15, 1943 |
| 2,559,365 | Middleton et al. | July 3, 1951 |

FOREIGN PATENTS

| | | |
|---|---|---|
| 304,374 | Great Britain | Jan. 21, 1929 |